United States Patent [19]

Koike

[11] Patent Number: 5,406,399
[45] Date of Patent: Apr. 11, 1995

[54] LIQUID CRYSTAL DISPLAY APPARATUS HAVING A FRAME AROUND PERIPHERY AND BOTTOM AND EXTENDING ABOVE BOTH POLARIZERS

[75] Inventor: Satofumi Koike, Kanagawa, Japan

[73] Assignee: Sony Corporation, Tokyo, Japan

[21] Appl. No.: 992,026

[22] Filed: Dec. 17, 1992

[30] Foreign Application Priority Data

Dec. 17, 1991 [JP] Japan .................................. 3-353817

[51] Int. Cl.⁶ .......................................... G02F 1/1333
[52] U.S. Cl. .......................................... 359/83
[58] Field of Search .......................................... 359/83

[56] References Cited

U.S. PATENT DOCUMENTS

| | | | |
|---|---|---|---|
| 4,422,728 | 12/1983 | Andreaggi | 359/83 |
| 4,560,264 | 12/1985 | Kitazawa et al. | 359/83 |
| 4,755,035 | 7/1988 | Kopish et al. | 359/83 |
| 4,756,604 | 7/1988 | Nakatsuka et al. | 359/83 |
| 4,796,977 | 1/1989 | Drake | 359/83 |
| 4,826,296 | 5/1989 | Yoshimura | 359/83 |
| 5,146,354 | 9/1992 | Plesinger | 359/83 |
| 5,182,660 | 1/1993 | Tanaka | 359/83 |
| 5,214,522 | 5/1993 | Tagawa | 359/83 |

FOREIGN PATENT DOCUMENTS

| | | | |
|---|---|---|---|
| 63-64022 | 3/1983 | Japan | 359/83 |
| 59-140424 | 8/1984 | Japan | 359/83 |
| 61-02126 | 1/1986 | Japan | 359/83 |
| 1-245225 | 9/1989 | Japan | 359/83 |

*Primary Examiner*—Anita Pellman Gross
*Attorney, Agent, or Firm*—Hill, Steadman & Simpson

[57] ABSTRACT

A liquid crystal display apparatus is disclosed which can effectively prevent chipping of a glass substrate or damage to a polarizing plate constituting a liquid crystal panel. The liquid crystal display apparatus comprises a liquid crystal panel including a pair of substrates having transparent electrodes on inner faces thereof, a liquid crystal layer held between the substrates, and a polarizing plate disposed on an outer face of each of the substrates. The liquid crystal panel is supported on a protective frame, and the end faces of the substrates are surrounded by a side wall of the protective frame which has a vertical dimension greater than the overall thickness of the liquid crystal panel. The protective frame and the liquid crystal panel are secured to each other by means of a bonding agent so as to form the liquid crystal display apparatus into a unitary block which is easy to handle.

11 Claims, 4 Drawing Sheets

LIQUID CRYSTAL DISPLAY APPARATUS HAVING A FRAME AROUND PERIPHERY AND BOTTOM AND EXTENDING ABOVE BOTH POLARIZERS

BACKGROUND OF THE INVENTION

1. Field of the Invention

This invention relates to a liquid crystal display apparatus which is incorporated in a personal computer, a word processor, a television set, a viewfinder of a video camera and so forth for displaying an image thereon, and more particularly to a protective structure for a liquid crystal panel constituting a display apparatus.

2. Description of the Prior Art

General structure of a liquid crystal panel is shown in FIG. 5. Referring to FIG. 5, the liquid crystal panel includes a pair of substrates 1 and 2 disposed in an opposing relationship to each other with a predetermined gap left therebetween, and a liquid crystal layer 3 enclosed in the gap. The substrates 1 and 2 are adhered to each other by means of a sealer 4. A plurality of transparent electrodes 5 made of ITO or a like material are formed by patterning on the inner surfaces of the substrates 1 and 2. The optical characteristic of the liquid crystal layer 3 is varied by applying a driving voltage between opposing ones of the electrodes 5. A polarizing plate 6 is adhered to an outer surface of each of the substrates 1 and 2 and extracts an optical variation of the liquid crystal layer 3 as a variation in the transmission factor to effect display of an image.

Since a liquid crystal panel functions as a light valve, the substrates thereof are each formed from a transparent material such as a glass plate. A liquid crystal panel is generally produced by a cell dividing method. A large number of sealer partitions are first printed on one of the surfaces of a large glass plate, and another glass plate is adhered to the first glass plate to form liquid crystal cells. Then, scribe lines are drawn along the partitions, and the glass plates are broken to separate the liquid crystal cells from one another. Since the scribe break is employed, the dimensions of the outer profile of a liquid crystal cell or a liquid crystal panel are not always high in accuracy. Further, the glass substrates themselves of a liquid crystal panel are liable to break.

A polarizing plate which is employed in a liquid crystal panel normally has such a structure that a polyvinyl alcohol film, to which drawing processing has been applied, is held between a pair of cellulose acetate films or the like. Since such high molecular films are employed, the polarizing plate is liable to undergo a damage or the like.

Conventionally, a liquid crystal panel is handled in a condition wherein the end faces of the glass substrates and the surfaces of the polarizing plates are left exposed outside. For example, a liquid crystal panel is transported or conveyed while it is accommodated directly in a case. Consequently, there is a problem that an external force is applied directly to an end face of a glass substrate to provide a damage such as chipping to the end face of the glass substrate. There is another problem that the surface of a polarizing plate is damaged similarly.

Various problems are involved also in incorporation of a liquid crystal panel. A conventional incorporation structure of a liquid crystal panel is shown in FIG. 6. Referring to FIG. 6, an upper frame 8 is placed on a lower frame 7 with a recessed portion 9 formed therebetween to make up a housing for accommodating a liquid crystal panel 10 therein. However, if the liquid crystal panel 10 is accommodated directly in the recessed portion 9, then there is the possibility that a glass plate thereof may be damaged. Therefore, it has been the practice that the liquid crystal panel 10 is incorporated with a pair of resilient spacers 11 interposed between the liquid crystal panel 10 and the lower and upper frames 7 and 8. Further, in order to protect the surface of the polarizing plates 6 from a damage or the like, a retaining spacer 12 which involves a clearance or escape is disposed between the lower and upper frames 7 and 8. In this and also in the incorporation of a liquid crystal panel, there is a problem that a countermeasure for preventing a break of a glass substrate or a countermeasure for preventing a damage to a polarizing plate must necessarily be figured out, and accordingly, design is complicated.

Various problems are involved also in incorporation of a liquid crystal panel into an outer package. As shown in FIG. 7, a liquid crystal panel 10 is accommodated in a recessed portion 14 provided at a central portion of an outer package casing 13. Since the dimensions of the outer profile of liquid crystal panels have a dispersion as described above, trouble will sometimes occur when the liquid crystal panel 10 is to be accommodated into the recessed portion 14. Further, there is the possibility that a glass plate may be damaged or broken if an excessive pressure is applied to any of protrusions 15 which support the liquid crystal panel 10 from above and below. In order to prevent chipping, the protrusions 15 must necessarily be spaced as far as possible from the end faces of the glass plates, and relief portions 16 must be provided. Consequently, there is a problem that the structure is complicated.

SUMMARY OF THE INVENTION

It is an object of the present invention to provide a liquid crystal display apparatus which can effectively prevent chipping of a glass substrate or damage to a polarizing plate constituting a liquid crystal panel.

In order to attain the object described above, according to the present invention, there is provided a liquid crystal display apparatus, which comprises a liquid crystal panel including a pair of substrates having transparent electrodes on inner faces thereof, a liquid crystal layer held between the substrates, and a polarizing plate disposed on an outer face of each of the substrates, and a protective frame having a side wall surrounding end faces of the substrates for supporting the liquid crystal panel thereon, the side wall having a vertical dimension greater than the overall thickness of the liquid crystal panel. Preferably, the protective frame and the liquid crystal panel are secured to each other by means of a bonding agent. The side wall, either along the entire periphery thereof or at at least at three different portions along the entire periphery thereof, may have vertical dimension greater than the overall thickness of the liquid crystal panel.

With the liquid crystal display apparatus, the outer periphery of the liquid crystal panel, that is, the end faces of the glass substrates, are surrounded by the side wall of the protective frame such that the liquid crystal panel is guarded so that it may not be directly touch with an external article. Further, since the outer periphery of the liquid crystal panel, whose outer profile may not have accurate dimensions due to a variation among products upon manufacture, is surrounded by the side wall of the protective frame which can be produced with a high degree of dimensional accuracy, the dimensional accuracy of the outer profile of the liquid crystal display apparatus itself is improved. Meanwhile, with regard to the thicknesswise direction of the liquid crystal panel, the vertical dimension of the side wall of the protective frame is set greater than the overall thickness of the liquid crystal panel such that the side wall may extend outwardly farther than the surfaces of the upper and lower polarizing plates so as to guard the surfaces of the polarizing plates so that they may not be directly touch with an external article. When the liquid crystal display apparatus is to be incorporated as a part into an apparatus body, the liquid crystal panel is mounted by way of the protective frame integrated therewith. Since the protective frame is high in dimensional accuracy, positioning of the liquid crystal panel in a plane is facilitated and the liquid crystal display apparatus can be positioned with a high degree of accuracy with reference to an outer profile standard, and besides the incorporation structure for the liquid crystal panel can be simplified. Further, with regard to the thicknesswise direction of the liquid crystal panel, even if a pressure must be applied to the side wall of the protective frame from above and/or below in order to incorporate the protective frame, no external force is applied directly to the glass substrates or the polarizing plates, and accordingly, otherwise possible chipping or damage can be prevented. Further, when transportation or conveyance of the liquid crystal display apparatus by itself is considered, since the protective frame is integrated with the liquid crystal panel, the outer periphery of the liquid crystal panel or the surfaces of the polarizing plates will not be touch with an external article, and accordingly, otherwise possible chipping of the glass substrates or damage to the polarizing plates can be prevented effectively.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
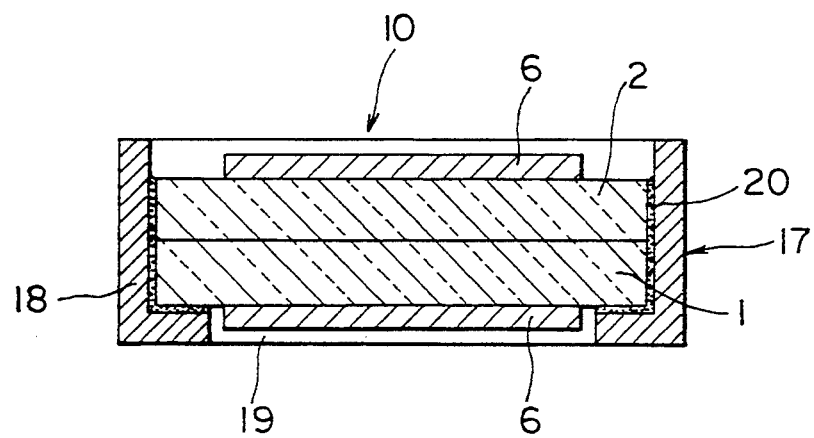
FIG. 1 is a schematic sectional view of a liquid crystal display apparatus showing a preferred embodiment of the present invention.
Figure 2:
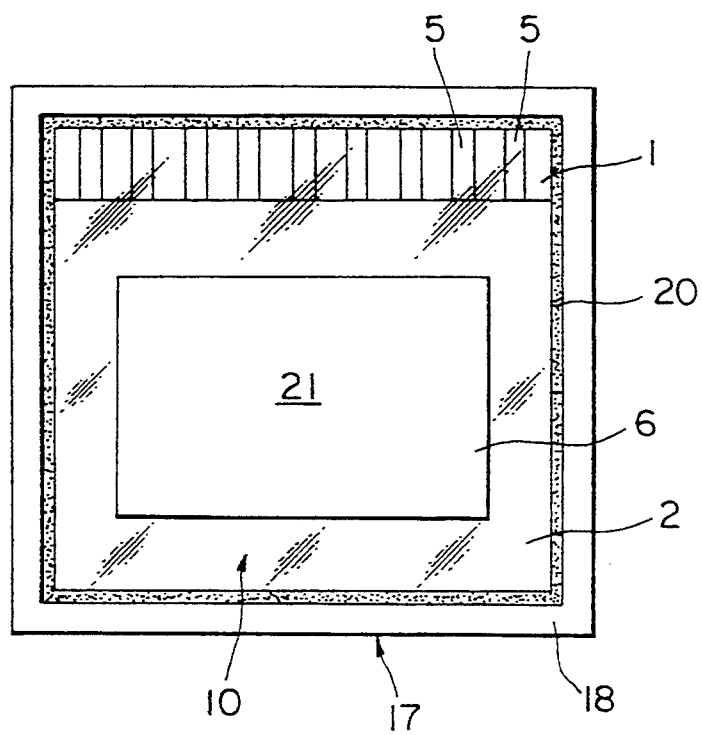
FIG. 2 is a schematic plan view of the liquid crystal display apparatus of FIG. 1.

Referring first to FIGS. 1 and 2, there is shown a liquid crystal display apparatus to which the present invention is applied. The liquid crystal display apparatus 21 has a generally rectangular shape in plan as seen in FIG. 2 and includes a liquid crystal panel 10 which itself has such common structure as shown in FIG. 1. In particular, the liquid crystal panel 10 includes a pair of rectangular glass substrates 1 and 2 adhered to each other, and a rectangular polarizing plate 6 disposed on the outer face of each of the glass substrates 1 and 2. The liquid crystal panel 10 is supported on a protective frame 17. The protective frame 17 is in the form of a rectangular frame and has a side wall 18 which surrounds an outer periphery, i.e., the four sides, of the liquid crystal panel 10. A rectangular opening 19 is formed in the bottom of the protective frame 17 so as to expose a display face of the liquid crystal panel 10 therethrough. The vertical dimension of the side wall 18 is set so as to exceed a total thickness of the liquid crystal panel 10, and the surface of the polarizing plate 6 on the upper glass substrate 2 is offset downwardly from the top end of the side wall 18. Consequently, even if the liquid crystal display apparatus is placed on a flat place, the surface of the polarizing plate 6 will not contact directly with an external article. Similarly, also the surface of the polarizing plate 6 on the lower glass substrate 1 does not extend downwardly from the lower end of the side wall 18, there is no possibility that it may contact an external article. The inner periphery of the protective frame 17 and the outer periphery of the liquid crystal panel 10 are secured to each other by a bonding agent 20 of the room temperature setting type. Since the bonding agent 20 is of the room temperature setting type, specific heat processing is not required, and accordingly, otherwise possible thermal deformation of the liquid crystal panel 10 can be prevented. If the dimension of the gap between the protective frame 17 and the liquid crystal panel 10 is set taking a variation in dimension of the outer profiles of panels into consideration, a possible error can be absorbed. Further, if a silicon resin or a like material having suitable resiliency is selected as the material of the bonding agent 20, an external force can also be absorbed. The protective frame 17 is formed from a resin material, and accordingly, it can be mass produced at a low cost with a high degree of accuracy by injection molding or the like.

In the embodiment described above, the protective frame is formed from a molded resin material. However, it can otherwise be formed by press work, bending or drawing using a metal material. Further, while the protective frame and the liquid crystal panel in the present embodiment are secured to each other using the bonding agent of the room temperature setting type, the securing means is not limited to this. In order to assure a higher adhesive strength, a bonding agent of the heat setting type may be employed alternatively. Further, it is also possible to secure the liquid crystal panel and the protective frame to each other using some other technique other than bonding agents. For example, the liquid crystal panel may be fitted directed in a recessed portion of the protective frame. Or, a bottom portion of the protective frame and the lower glass substrate of the liquid crystal panel may be screwed to each other.

FIG. 2 shows the shape in plan of the liquid crystal display apparatus shown in FIG. 1. The liquid crystal display apparatus 21 includes the liquid crystal panel 10 and the protective frame 17 which is disposed so as to surround the outer periphery of the liquid crystal panel 10. Since the longitudinal and lateral dimensions of the protective frame 17 are high in accuracy, they are used as outer profile standards upon incorporation. The top end portion of the side wall 18 extend upwardly above the surface of the polarizing plate 6 adhered to the upper glass substrate 2. It is to be noted that, while the upper end face of the side wall 18 in the present embodiment has an equal vertical dimension along the entire periphery thereof, it need not have such a specific construction. The function of protecting the polarizing plate can be achieved even if the side wall 18 has only three projected portions which extend upwardly above the surface of the upper polarizing plate 6. It is to be noted that the liquid crystal panel 10 has a face along which the lower glass substrate 1 is exposed outside. A plurality of transparent electrodes 5 for external connection are led out on the face of the liquid crystal panel 10.

Figure 3:
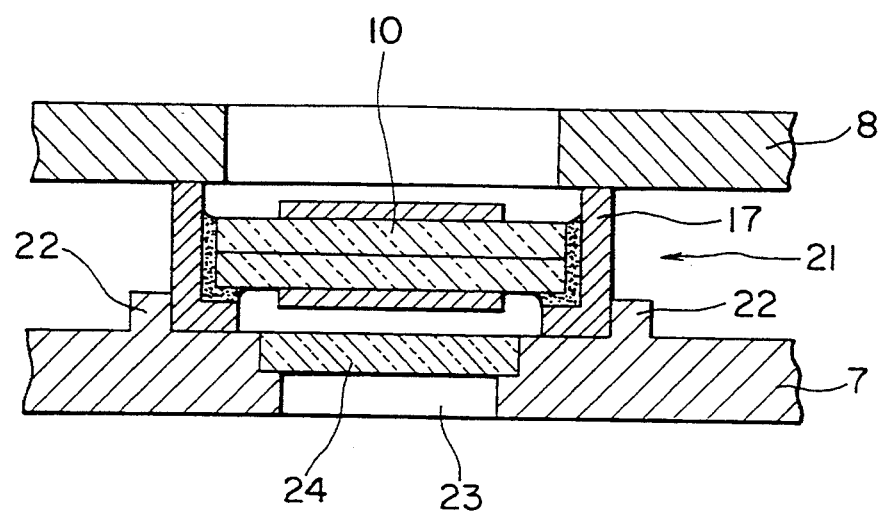
FIG. 3 is a schematic sectional view showing a form of incorporation structure of the liquid crystal display apparatus of FIG. 1.
Figure 6:
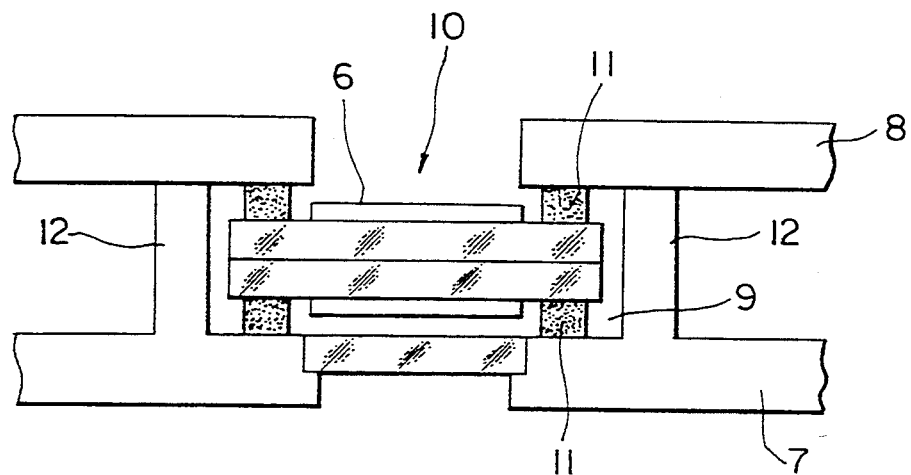
FIG. 6 is a schematic sectional view showing a form of conventional incorporation structure of the liquid crystal panel of FIG. 5.

Referring now to FIG. 3, there is shown a form of incorporation or mounting structure of the liquid crystal display apparatus shown in FIGS. 1 and 2. Here, the liquid crystal display apparatus 21 is incorporated in a housing of an apparatus body. A positioning and guiding rib 22 having a rectangular frame shape in plan is formed on a lower frame 7. A transparent window member 24 is fitted in a stepped opening 23 within the area surrounded by the rib 22. The liquid crystal display apparatus 21 in the form of a unitary block of the liquid crystal panel and the protective frame can be positioned in a plane by merely dropping it into the area inside the rib 22. With regard to the thicknesswise direction of the liquid crystal display apparatus 21, it can be positioned and fixed by contacting the other frame 8 with the liquid crystal display apparatus 21 from above. As can be seen from FIG. 3, the frames 7 and 8 are held in contact with the protective frame 17 but do not contact directly with the liquid crystal panel 10 itself. Consequently, an otherwise possible break of a glass substrate or damage to a polarizing plate can be prevented effectively. As apparent from the comparison between the arrangement shown in FIG. 3 and the conventional arrangement shown in FIG. 6, the mounting or incorporation structure of the liquid crystal display apparatus is simplified considerably.

Figure 4:
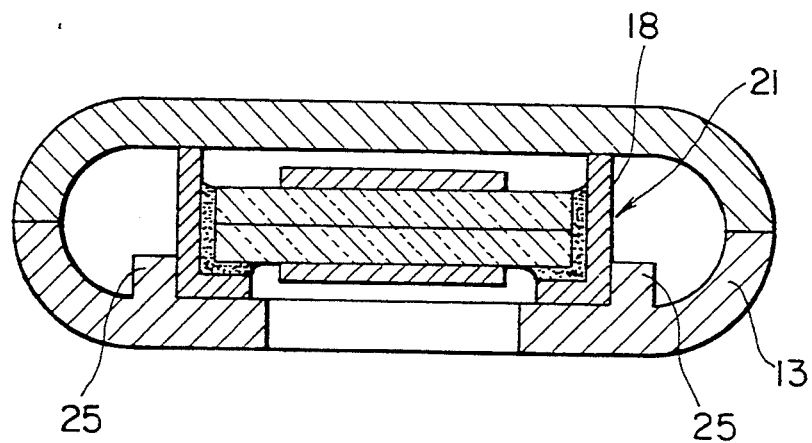
FIG. 4 is a schematic sectional view showing another form of incorporation structure of the liquid crystal display apparatus of FIG. 1.
Figure 5:
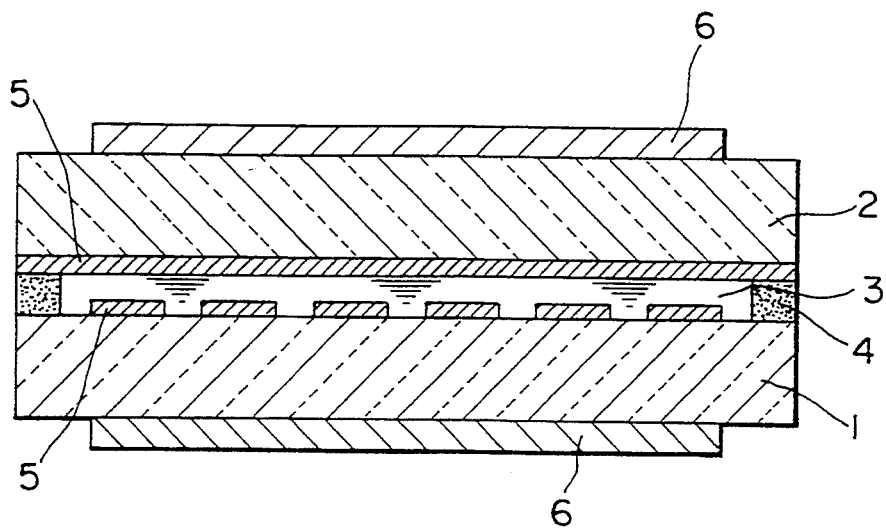
FIG. 5 is a schematic sectional view showing a conventional liquid crystal panel.
Figure 7:
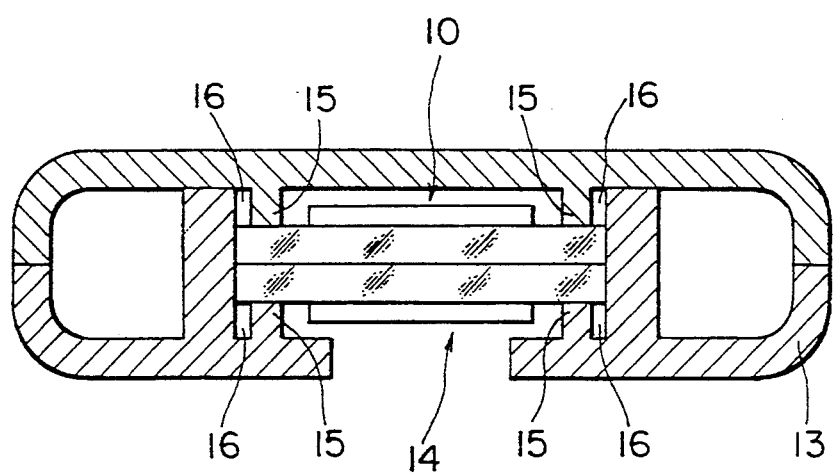
FIG. 7 is a schematic sectional view showing another form of conventional incorporation structure of the liquid crystal panel of FIG. 5.

Referring now to FIG. 4, there is shown another form of incorporation or mounting structure of the liquid crystal display apparatus. In the present arrangement, the liquid crystal display apparatus 21 to which the present invention is applied is incorporated in an outer package casing 13. Similar to the arrangement shown in FIG. 3, a rectangular positioning and guiding rib 25 is provided at a central portion of the outer package casing 13. The liquid crystal display apparatus 21 can be positioned in a plane along the rib 25. Meanwhile, with regard to the vertical direction, the vertical dimension of the side wall 18 of the protective frame should be set suitably in accordance with the dimension of a gap of the outer package casing 13. As apparent from the comparison between the present arrangement and the conventional arrangement shown in FIG. 7, the incorporation structure of the liquid crystal display apparatus can be simplified remarkably by forming the liquid crystal panel and the protective frame as a unitary block.

Having now fully described the invention, it will be apparent to one of ordinary skill in the art that many changes and modifications can be made thereto without departing from the spirit and scope of the invention as set forth herein.

What is claimed is:

1. A liquid crystal display device comprising:
   a liquid crystal panel comprising a pair of substrates having transparent electrodes on inner surfaces thereof, a liquid crystal layer disposed between the substrates, and a polarizer mounted on the outer surface of each substrate, and
   protection means for protectively receiving a peripheral edge of the pair of substrates, said protection means being a frame having a side wall integral with a bottom wall with a window surrounding the polarizer on the outer surface of a bottom substrate of the pair of substrates, said frame having a height greater than the thickness of the liquid crystal panel.

2. A liquid crystal display device as claimed in claim 1, wherein said protection means is formed of a molded resin.

3. A liquid crystal display device as claimed in claim 1, wherein said protection means is formed of a metal material.

4. A liquid crystal display device according to claim 1, wherein said protection means and the periphery of the substrates are joined together by an adhesive.

5. A liquid crystal display device according to claim 4, wherein said adhesive comprises a resilient material to protect the substrates from externally applied shocks.

6. A liquid crystal display device according to claim 1, wherein said liquid crystal panel is positioned by inner surfaces of the side wall and bottom wall.

7. A liquid crystal display device comprising:
   a pair of substrates having electrodes on an inner surface thereof;
   a pair of polarizers with a polarizer being disposed on the outer surface of each of the substrates; and
   a frame having a front wall formed with a display window, and a peripheral wall, said peripheral wall having an outer wall surface extending between edges with both edges being above the polarizer surfaces.

8. A liquid crystal display device according to claim 7, wherein peripheral edges of the substrates are adhered to the frame.

9. A liquid crystal display device according to claim 7, wherein peripheral edges of the substrates are bonded to the frame by a resilient adhesive.

10. A liquid crystal display device comprising:
    a liquid crystal panel comprising a pair of substrates having transparent electrodes on inner surfaces thereof, a liquid crystal layer disposed between the substrates, and a polarizer being disposed on an outer surface of each substrate, and
    protection means for protectively receiving a peripheral edge of the pair of substrates, said protection means including a bottom wall integral with a side wall to form a frame member with a top and bottom, said bottom wall having an opening to receive the polarizer on the bottom substrate of the pair of substrates, said frame member having a height greater than the thickness of the liquid crystal panel, said side wall being connected to the peripheral edge without engaging the polarizers and with the top and bottom of the frame member extending beyond the plane of each polarizer so that the edges of the substrates and polarizer are protected from damage.

11. A liquid crystal display device according to claim 10, wherein the side wall is connected to the peripheral edge by a resilient adhesive.

* * * * *